United States Patent [19]
Okabe et al.

[11] Patent Number: 6,037,559
[45] Date of Patent: Mar. 14, 2000

[54] PROCESS FOR LAP JOINING TWO KINDS OF METALLIC MEMBERS HAVING DIFFERENT MELTING POINTS

[75] Inventors: Shinji Okabe; Takanori Yahaba, both of Saitama-ken, Japan

[73] Assignee: Honda Giken Kogyo Kabushiki Kaisha, Tokyo, Japan

[21] Appl. No.: 09/043,397

[22] PCT Filed: Sep. 18, 1996

[86] PCT No.: PCT/JP96/02676

§ 371 Date: Mar. 17, 1998

§ 102(e) Date: Mar. 17, 1998

[87] PCT Pub. No.: WO97/10920

PCT Pub. Date: Mar. 27, 1997

[30]     Foreign Application Priority Data

Sep. 18, 1995  [JP]  Japan ................................. 7-263469
Feb. 19, 1996  [JP]  Japan ................................. 8-030365

[51] Int. Cl.⁷ .................................................. B23K 11/20
[52] U.S. Cl. ........................................ 219/91.23; 219/118
[58] Field of Search ................................ 219/78.16, 86.1, 219/91.2, 91.23, 92, 93, 94, 118, 157

[56]     References Cited

U.S. PATENT DOCUMENTS 3,277,268  10/1966  Williams et al. ......................... 219/92
3,576,963   5/1971  Vowels ..................................... 219/92
5,302,797   4/1994  Yasuyama et al. ..................... 219/118
5,783,794   7/1998  Oikawa et al. ......................... 219/118

FOREIGN PATENT DOCUMENTS 0106261  4/1984  European Pat. Off. .
5-111776  5/1993  Japan .
5-111778  5/1993  Japan .
7-214338  8/1995  Japan .

*Primary Examiner*—Gregory Mills
*Attorney, Agent, or Firm*—Lyon & Lyon LLP

[57]                ABSTRACT

A circular blank made of a steel plate is lapped onto an Al-based plate in lapped areas of the Al alloy plate and another steel plate. Then, the three members are pressed by a pair of electrodes, and a welding current is allowed to flow between both the electrodes, thereby sequentially performing the melting of a current-supplied portion of the Al alloy plate and a portion near the current-supplied portion, the elimination of a molten portion by a partial bulgy deformation of the blank toward the Al alloy plate, the abutment of the bulgy deformed portion against the steel plate, and the resistance-welding between the bulgy deformed portion and the steel plate.

3 Claims, 19 Drawing Sheets

1mm

PROCESS FOR LAP JOINING TWO KINDS OF METALLIC MEMBERS HAVING DIFFERENT MELTING POINTS

FIELD OF THE INVENTION

The present invention relates to a process for lap-bonding of two metal members having different melting points, and particularly, to such a lap bonding process which includes lapping a first metal member and a second metal member having a melting point higher than that of the first metal member onto each other, and bonding the lapped areas to each other.

BACKGROUND ART

If a spot welding process using a large electric current is utilized to bond lapped areas of two metal members having different melting points, e.g., an Al-based member (aluminum having a melting point of 660° C.) and an Fe-based member (iron having a melting point of 1,540° C.), a nugget is formed on the Al-based member following melting of the latter due to a difference in melting points between both the members, but a phenomenon occurs that the Fe-based member is hardly molten.

If the strength of weld zone of such different members is examined, it can be seen that the weld zone shows a strength substantially equal to that of the weld zone of Al-based members, namely the same type of members in a tensile shearing test, but shows a strength, for example, of only about one sixth of that of the same type of the members in a U-tensile test.

Therefore, it is a conventional practice to employ a process in which a clad material comprised of an Al alloy layer and a steel layer is interposed between the lapped areas of the Al-based member and the Fe-based member, with the Al alloy layer located on the side of Al-based member and the steel layer located on the side of Fe-based member (see Japanese Patent Application Laid-open No.111778/1993).

However, the prior art process suffers the following problems: In a case where the lapped areas have a complicated shape such as an arcuate shape, the accommodatability is poor, and a gap is produced between the Al-based member and the Fe-based member in the lapped areas depending upon the thickness of the clad material and as a result, the places where this process can be applied are largely limited in respect of the design. In a case where the clad materials are dotted between the lapped areas, the air-tightness of the weld zone is injured by the gap. On the other hand, in a case where the clad material is mounted over the entire length of the lapped areas, an increase in weight is caused. In addition, the clad material is relatively expensive and hence, an increase in manufacture cost of the bonded product cannot be avoided.

A further attempt has been made to provide a solid-phase bonding between Fe-based and Al-based members by decreasing a welding current.

For example, Japanese Patent Application Laid-Open No. 7-214338 discloses a technique for bonding an Fe-based metal material and an Al-based metal material by a resistance welding with use of a pin made of an Fe-based metal material having a substantially T-shaped section. However, in the case of this prior art process, the pin which is pressed by an electrode to penetrate through at least one of the materials has a complicated shape. For this reason, there are problems that the manufacture cost for the pin is increased, and in the bonding operation, labors are required by positioning and handling of the pin, resulting in a poor efficiency.

Further, the surface of the Al-based member is covered with a firm oxide film and for this reason, an enhancement in a bond strength to be provided by the solid phase bonding is hindered by the oxide film.

To avoid this, it is necessary to subject the Al-based member to an oxide film removing treatment, e.g., a brushing using a wire brush. However, the carrying-out of such a treatment is undesirable, because it increases the operating steps and the operating cost.

Furthermore, Japanese Patent Publication No. 52-2378 teaches a technique for bonding materials by a spot welding, which comprises preparing a hard material having a relatively large hardness and a high melting point and a soft material having a relatively small hardness and a low melting point, forming at least one of the materials into a rounded bar-like shape, and lapping the materials onto each other to bond them to each other, while pressing them from above and below by the pair of electrodes. With this process, an oxide film generated in the surface of the soft material formed by an Al alloy, for example, can be destroyed by a plastic deformation, and therefore, there is an advantage of enhancing the welding strength. In addition, a recessed groove positioning the hard material in a predetermined position is provided in one of the electrodes pressing the hard material, and therefore, there is an advantage that any deviation in the relative positional relationship between both the materials can effectively be prevented. However, the hard material opposed to the electrode in which the recessed groove is formed is limited to ones having such a shape that can be engaged into the recessed groove, and therefore, there is a demerit that the utilization is limited.

SUMMARY OF THE INVENTION

Accordingly, it is an object of the present invention to provide a bonding process of the above-described type, wherein even in a case where lapped areas have a complicated shape, the accommodatability is good, and the generation of a gap in the lapped areas can be avoided and the workability is enhanced and moreover, the manufacture cost of the bonded product can be reduced.

To achieve the above object, according to the present invention, there is provided a lap bonding process which includes lapping a first metal member and a second metal member having a melting point higher than that of the first metal member onto each other, and bonding resulting lapped areas to each other, the process comprising the steps of lapping a plate shaped third metal member onto the first metal member in the lapped areas, the third metal member having a melting point higher than that of the first metal member and being capable of being plastically deformed and resistance-welded to the second metal member; pressing the first, second and third metal members by a pair of electrodes and allowing a welding current to flow between both the electrodes, thereby sequentially performing a melting of a current-supplied portion of the first metal member and a portion of the first metal member near the current-supplied portion, an elimination of a molten portion produced in the first metal member by a partial bulgy deformation of at least one of the second and third metal members, and a resistance welding of the second and third metal members through a bulgy deformed portion of the at least one member.

With the above process, the first and second metal members are firmly bonded to each other through a bulgy deformed portion.

The plate-shaped third metal member may be a blank produced by punching and hence, has a large degree of freedom in the shape. As a result, even when the lapped area has a complicated shape, It is possible to easily accommodate the complicated shape.

Further, the plate-shaped third metal member is lapped onto the first metal member in the lapped area and hence, a gap cannot be produced between the first and second metal members.

Moreover, a plate-shape member is used as the third metal member and hence, increases in manufacture cost and weight of a bonded product due to use of the third metal member are suppressed.

It is another object of the present invention to provide a bonding process of the above-described type, wherein in the course of welding the Al-based member to the Fe-based member, various shapes of the members are applicable.

To achieve the above object, according to the present invention, there is provided a lap bonding process for lapping a first metal member and a second metal member having a melting point higher than that of the first metal member onto each other, and bonding resulting lapped areas to each other, the process including the steps of selecting an Al-based member having a planar portion as the first metal member and an Fe-based member having a planar portion as the second metal member; lapping the first and second metal members onto each other at the planar portions; pressing the lapped areas by a pair of electrodes and supplying an electric current between the electrodes, thereby forming a recess on a bonded surface of the Al-based member by a deformation of the Al-based member through medium of a pressed and current-supplied portion of the Fe-based member; and bonding the pressed and current-supplied portion and the Al-based member at the recess.

In the above process, by lapping the first and second metal members onto each other at the planar portions, and pressing and supplying a current to the lapped areas, a recessed portion is formed in the Al-based first metal member due to its deformation. And the welding is performed utilizing the recessed portion, thereby enabling the process to be applied in infinitely wide fields.

DETAILED DESCRIPTION OF PREFERRED EMBODIMENTS OF THE INVEVTION

EXAMPLE I

Figure 1:
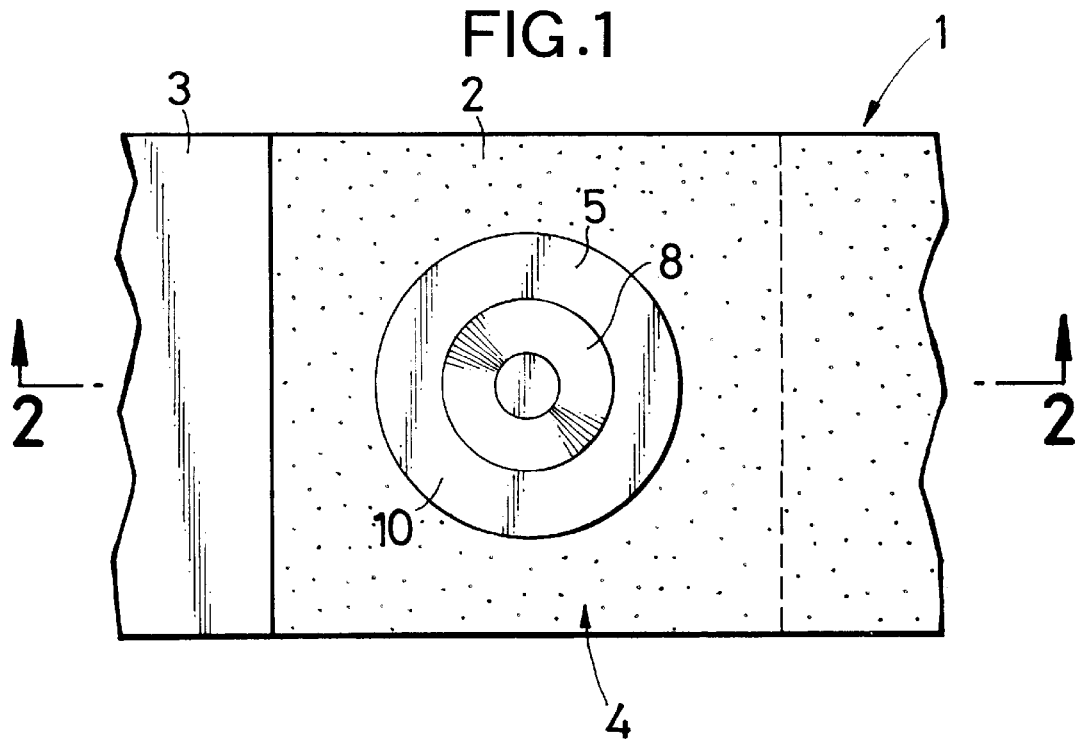
FIG. 1 is a plan view of a first example of a bonded product.
Figure 2:
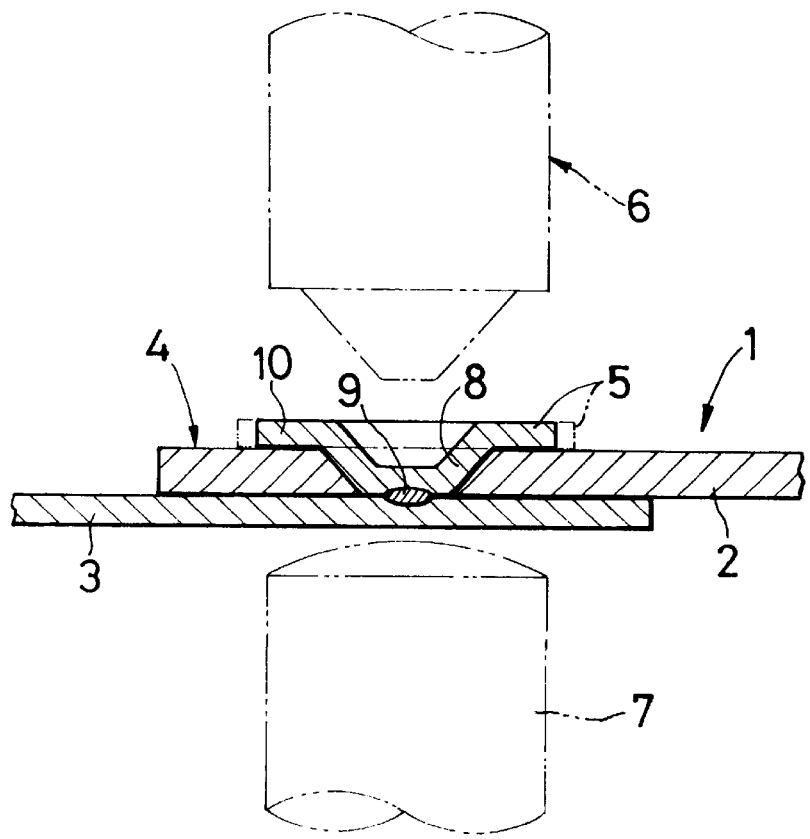
FIG. 2 is a sectional view taken along a line 2—2 in FIG. 1.

Referring to FIGS. 1 and 2, a bonded product 1 includes an Al alloy plate (or an Al plate) 2 as an Al-based member which is a first metal member, and a steel plate (an Fe alloy plate or an Fe plate) 3 as an Fe-based member which is a second metal member having a melting point higher than that of the Al alloy plate 2, with lapped areas 4 of the plates 2 and 3 being bonded to each other.

For the lap bonding process, a circular blank 5 made by punching from a third metal member having a melting point higher than that of the Al alloy plate 2, e.g., a steel plate, is used, and a spot welding as a resistance welding is utilized.

A bonded structure produced by the lap bonding process is such that a bulgy deformed portion 8 resulting from that plastic deformation of a central portion of the circular blank 5 which has been produced by pressing the members by upper and lower electrodes 6 and 7 made by O. F. C. and by supplying a welding current is spot-welded to the steel plate 3 to form a nugget 9, with a molten portion of the Al alloy plate 2 being eliminated, and an outer peripheral portion 10 of the circular blank 5 is in pressure contact with the Al alloy plate 2.

The lap bonding process will now be described in detail.

Figure 3:
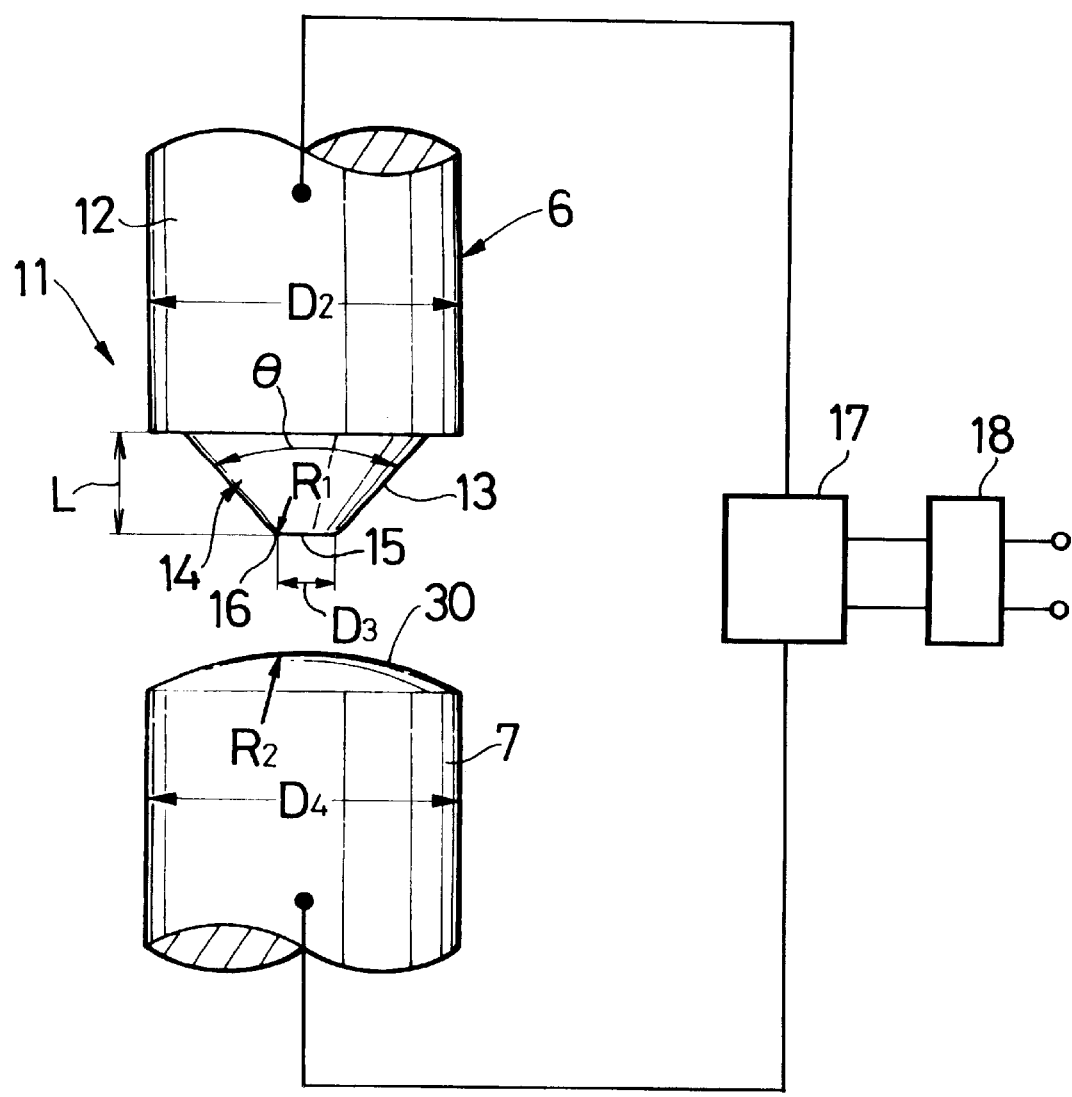
FIG. 3 is a view for explaining a spot welding machine.
Figure 4:
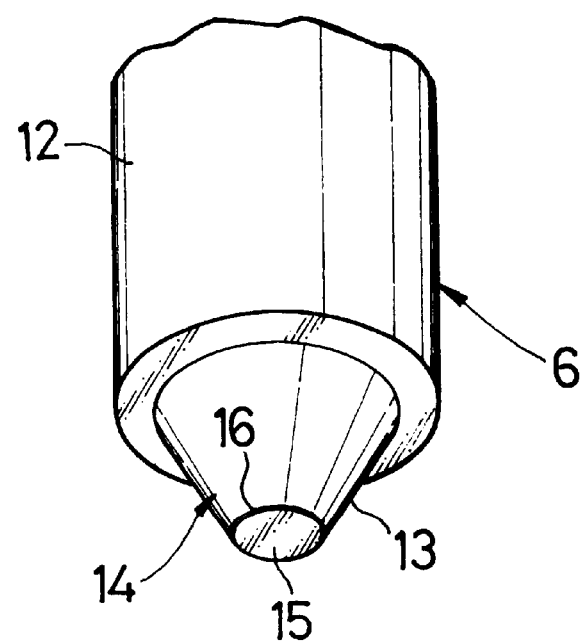
FIG. 4 is a perspective view of an essential portion of a first example of an upper electrode.

Referring to FIGS. 3 and 4, an upper electrode 6 of a spot welding machine 11 is comprised of a rod-like electrode body 12 which is circular in section, and a truncated conical protrusion 14 provided on a lower end face of the electrode body 12 to project therefrom and having a draft 13. Therefore, the protrusion 14 has a circular section within a plane intersecting an axial direction of the electrode. A rounded portion 16 is provided at a peripheral edge of a smaller end face 15 of the protrusion 14. A JIS R-type electrode is used as a lower electrode 7, but a JIS CF-type electrode or a CR-type electrode may also be used. In Figures, reference numeral 17 is a transformer, and 18 is an inverter-type controller.

Figure 5:
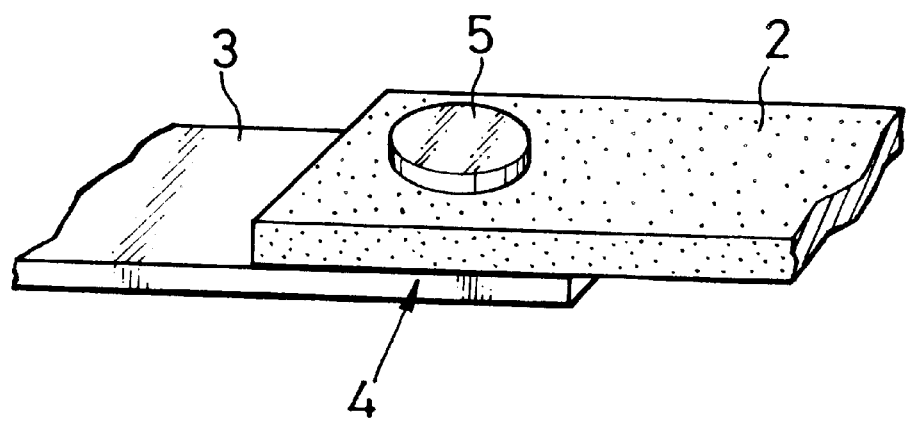
FIG. 5 is a perspective view of an essential portion, showing one example of a state in which a circular blank, an aluminum alloy plate and a steel plate have been lapped together.

(a) As shown in FIG. 5, one end of the Al alloy plate 2 is lapped onto one end of the steel plate 3 and then, the circular blank 5 is lapped onto the Al alloy plate 2 in the lapped area 4.

Figure 6:
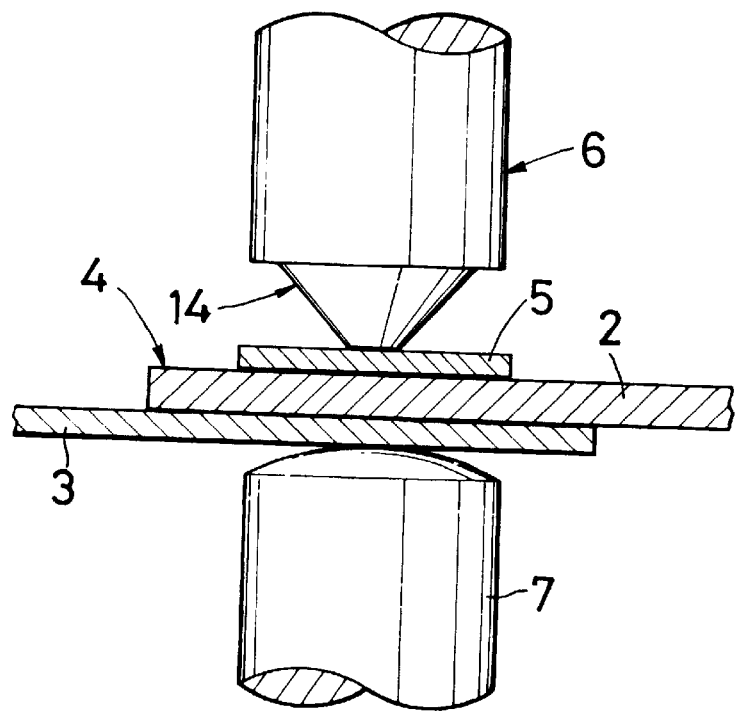
FIG. 6 is an explanatory view showing a state in which the circular blank, the aluminum alloy plate and the steel plate are pressed between upper and lower electrodes and a welding current is allowed to flow between both the electrodes.

(b) As shown in FIG. 6, the circular blank 5, the Al alloy plate 2 and the steel plate 3 are disposed between both the electrodes 6 and 7 with the circular blank 5 located on the side of the upper electrode 6, and then, those members 5, 2 and 3 are pressed by both the electrodes 6 and 7, and at the same time, a welding current is allowed to flow between both the electrodes 6 and 7.

Figure 7:
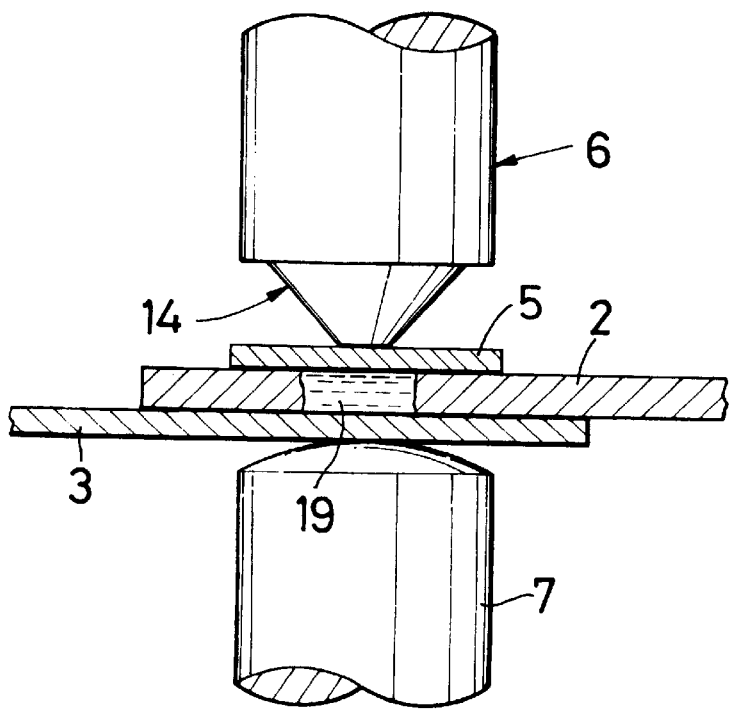
FIG. 7 is an explanatory view showing a state in which a portion of the aluminum alloy plate has been molten.

(c) As shown in FIG. 7, the circular blank 5, the Al alloy plate 2 and the steel plate 3 are heated by a contact resistance as a result of supplying of the current in the state in which they have been pressed, and then, the current-supplied portion 19 of the Al alloy plate 2 having a lower melting point and a portion near the current-supplied portion 19 are molten, while the current-supplied portions of the circular blank 5 and the steel plate 3 and portions near them are softened.

Figure 8:
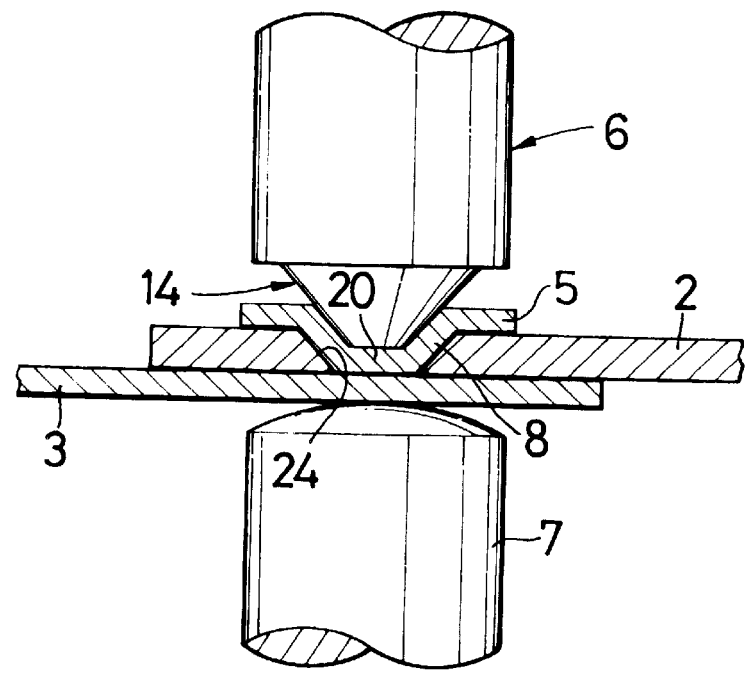
FIG. 8 is an explanatory view showing a state in which the circular blank has been deformed to be partially bulgy.

(d) As shown in FIG. 8, the central portion of the circular blank 5 pressed by the truncated conical protrusion 14 of the upper electrode 6 is deformed to be bulgy toward the Al alloy plate 2 to form a truncated conical shape, whereby the molten portion is eliminated and moved to a gap between the Al alloy plate 2 and the steel plate 3. Therefore, a smaller end 20 of the bulgy deformed portion 8 is put into abutment against the steel plate 3.

Figure 9:
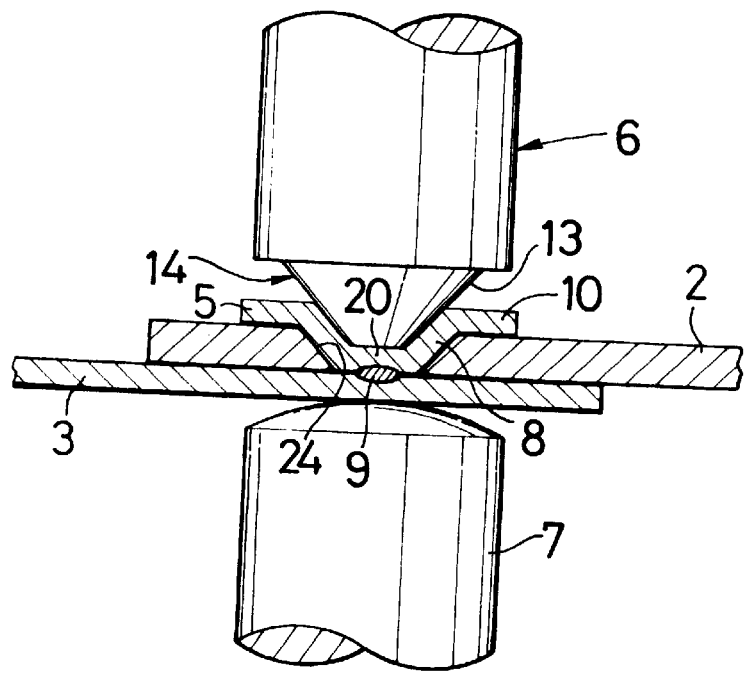
FIG. 9 is an explanatory view showing a state in which the bulgy deformed portion and the steel plate have been bonded to each other.

(e) As shown in FIG. 9, the smaller end 20 of the bulgy deformed portion 8 and the steel plate 3 abutting against the smaller end 20 are supplied with the current in the state in which they are by the electrodes 6 and 7. Therefore, the smaller end 20 and the steel plate 3 are spot-welded to each other to form the nugget 9, thereby forming the welded zone in the same-type materials.

After such spot-welding, the truncated conical protrusion 14 of the upper electrode 6 is easily withdrawn from the bulgy deformed portion 8, because it has the draft 13.

With the above-described process, the Al alloy plate 2 is firmly bonded to the steel plate 3 with a rivet coupling-like fastened structure provided by the outer peripheral portion 10 and the bulgy deformed portion 8 of the circular blank 5.

In addition, the circular blank 5 made by punching has a larger degree of freedom in the shape and as a result, even when the lapped area 4 has a complicated shape, it is possible to easily accommodate this.

Further, the circular blank 5 is lapped onto the Al alloy plate 2 in the lapped area 4 and hence, a gap cannot be produced between the Al alloy plate 2 and the steel plate 3.

Moreover, the circular blank 5 is of a single-plate structure and hence, increases in manufacture cost and weight of the bonded product 1 due to the use of the circular blank 5 are inhibited.

In the above-described lap bonding example, the bulgy deformed portion 8 can be formed on the steel plate 3 using the lower electrode 7 having the same shape as the upper electrode 6. Alternatively, bulgy deformed portions 8 can be formed on both of the circular blank 5 and the steel plate 3, respectively.

Figure 10:
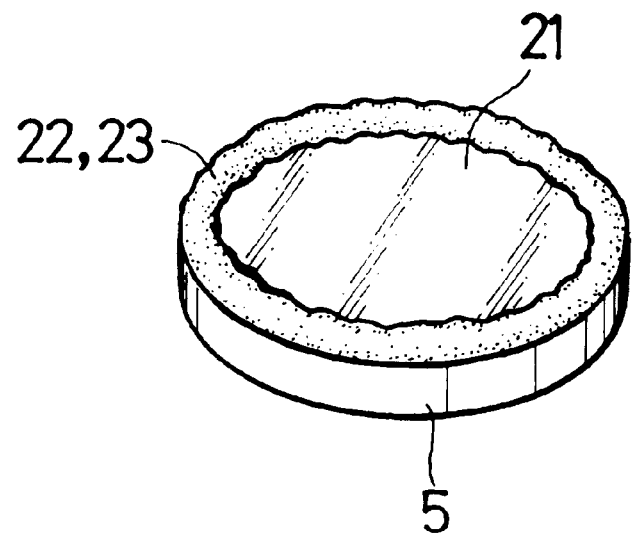
FIG. 10 is a perspective view of the circular blank having an adhesive applied thereto.

As shown in FIG. 10, an adhesive 22 is applied to the entire periphery of that surface 21 of the circular blank 5 which is opposed to the Al alloy plate 2, whereby the circular blank 5 can be reliably retained at a predetermined position in the lapped area 4 to enhance the bonding operability.

Figure 11:
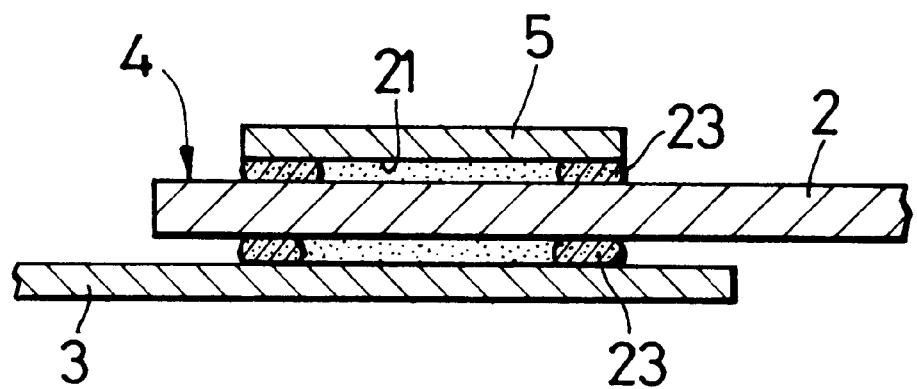
FIG. 11 is a sectional view showing another example of the state in which the circular blank, the aluminum alloy plate and the steel plate have been lapped together.

As shown in FIG. 11, the adhesive 22 may be replaced by a sealing material 23, and the sealing material 23 may be interposed in an annulus between the Al alloy plate 2 and the steel plate 3 in the lapped area 4, whereby the corrosion resistance of the bonded zone including a bore 24 (see FIG. 9) produced in the Al alloy plate 2 by the bonding operation can be enhanced.

Figure 12A:
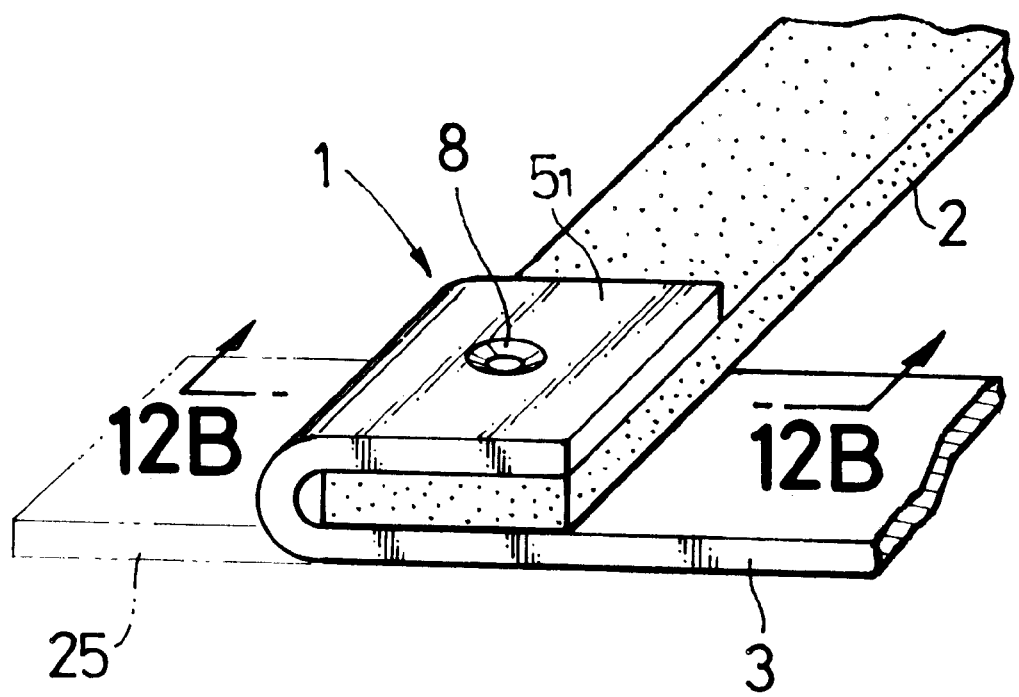
FIG. 12A is a perspective view of an essential portion, showing a second example of the bonded product.
Figure 12B:
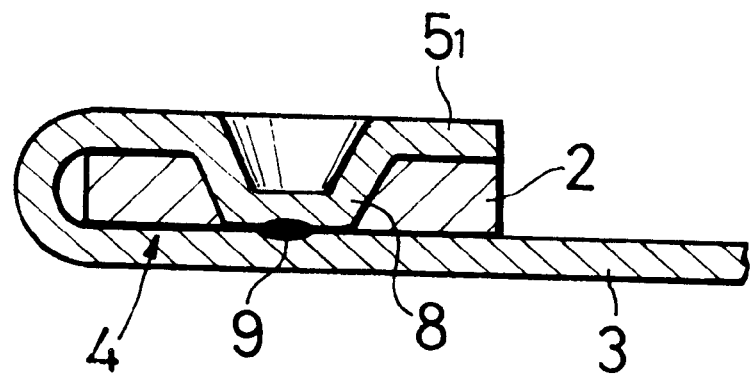
FIG. 12B is a sectional view taken along a line 12B—12B in FIG. 12A.
Figure 13:
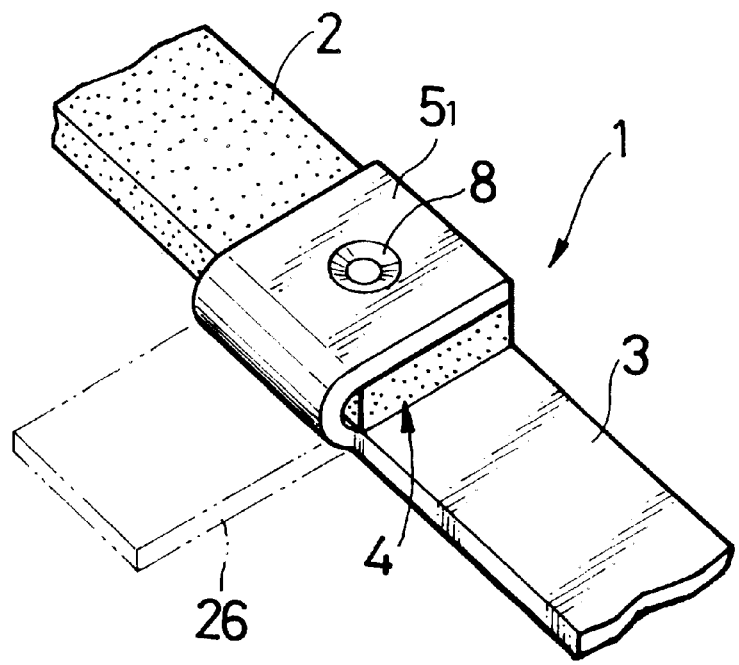
FIG. 13 is a perspective view of an essential portion, showing a third example of the bonded product.
Figure 14:
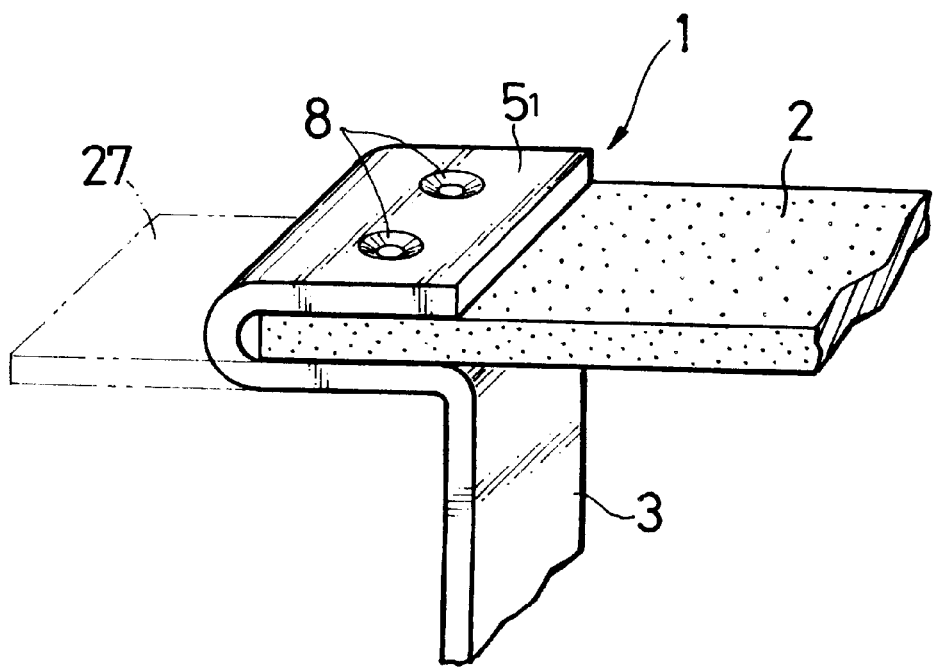
FIG. 14 is a perspective view of an essential portion, showing a fourth example of the bonded product.

FIGS. 12 to 14 show three examples of bonded products 1, wherein a third metal member is formed utilizing the plastically deforming ability of the steel plate 3.

The example shown in FIGS. 12A and 12B was produced in the following manner: One end 25 of the steel plate 3 was folded back. The folded-back portion $5_1$ is used as a third metal member. Then, one end of the Al alloy plate 2 was inserted between the steel plate 3 and the folded-back portion $5_1$, so that both the planes of both the Al alloy plate 2 and the steel plate 3 were parallel to each other, and the directions of extensions of the plates 2 and 3 crossed each other at 90°. Thereafter, a bonding process similar to that described above was carried out.

The example shown in FIG. 13 was produced in the following manner: A plate-like protrusion 26 was provided at one side edge of an end of the steel plate 3, so that the plate-like protrusion 26 and the steel plate 3 are located on the same plane. The plate-like protrusion 26 was folded back, and the folded-back portion $5_1$ was used as a third metal member. Then, one end of the Al alloy plate 2 was inserted between the steel plate 3 and the folded-back portion $5_1$, so that both the planes of the Al alloy plate 2 and the steel plate 3 were parallel to each other and the plates 2 and 3 extended in the same direction. Thereafter, a bonding process similar to that described above was carried out.

The example shown in FIG. 14 was produced in the following manner: Substantially half of a plate-like folded portion 27 formed by folding one end of the steel plate 3 at right angle was folded back, and the folded-back portion $5_1$ was used as a third metal member. Then, one end of the Al alloy plate 2 was inserted between the steel plate 3 and the folded-back portion $5_1$, so that both the planes of the Al alloy plate 2 and the steel plate 3 were in a right angle relation to each other and the directions of extensions of the plates 2 and 3 crossed each other at 90°. Thereafter, a bonding process similar to that described above was carried out.

Particular examples will be described below.

A. U-tensile Strength

Figure 15:
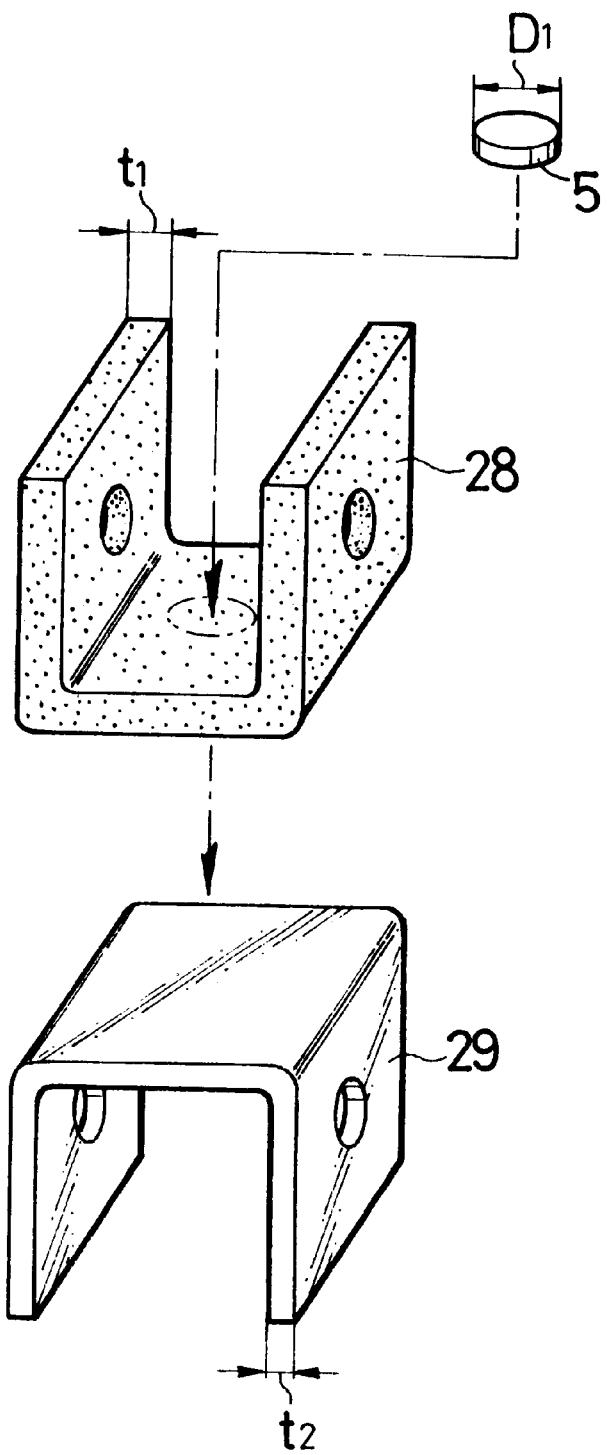
FIG. 15 is an exploded perspective view of a U-tensile test piece.

As shown in FIG. 15, first halves 28 for a plurality of U-tensile test pieces were made from the Al alloy plate 2, and second halves 29 for a plurality of U-tensile test pieces were made from the steel plate 3, both according to JIS Z 3137. Further, the steel plate 3 was subjected to a punching to provide a plurality of circular blanks 5.

The material for the Al alloy plate 2 is JIS 5182 and had a thickness $t_1$ set at 1.0 mm. On the other hand, the material for the steel plate 3 is JIS SPCC and had a thickness $t_2$ set at 0.7 mm. In this case, $t_1=(2^{1/2})\times t_2$ is established between the thickness $t_1$ of the Al alloy plate 2 and the thickness $t_2$ of the steel plate 3. This is for the purpose of ensuring that the plates 2 and 3 have substantially the same rigidity. The circular blank 5 had a diameter $D_1$ set at 15 mm.

As shown in FIG. 3, in the upper electrode 6, the diameter $D_2$ of the electrode body 12 is set at 16 mm; the taper angle θ of the truncated conical protrusion 14 is set at 90 degrees; the length L is set 4 mm; and the radius $R_1$ of the rounded portion 16 at the peripheral edge of the smaller end face 15 is set at 1 mm. The smaller-end diameter $D_3$ is varied in a range of 4 to 7 mm.

In the lower electrode 7, the diameter $D_4$ is set at 16 mm; and the radius $R_2$ of a spherical tip end face 30 is set at 80 mm.

Figure 16:
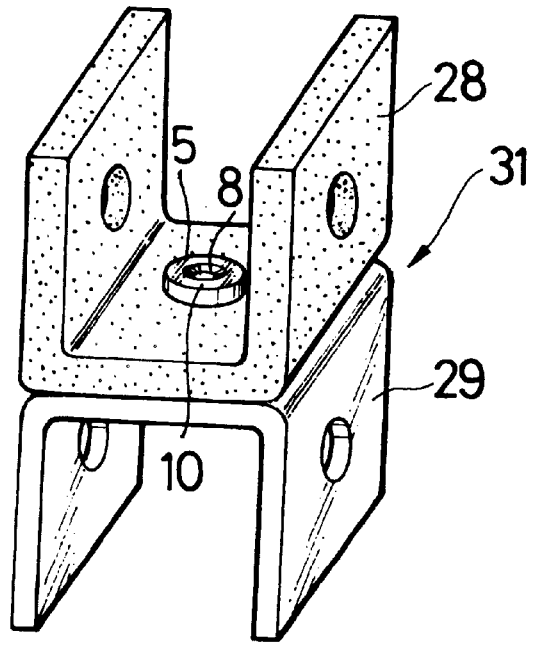
FIG. 16 is a perspective view showing a first example of a U-tensile test piece.

A plurality of U-tensile test pieces 31 as shown in FIG. 16 according to an embodiment were produced by carrying out a bonding process similar to that described above (see FIGS. 5 to 9), except that the first and second halves 28 and 29 and a circular blank 5 were used and the welding conditions and the upper electrode 6 were changed.

Figure 17:
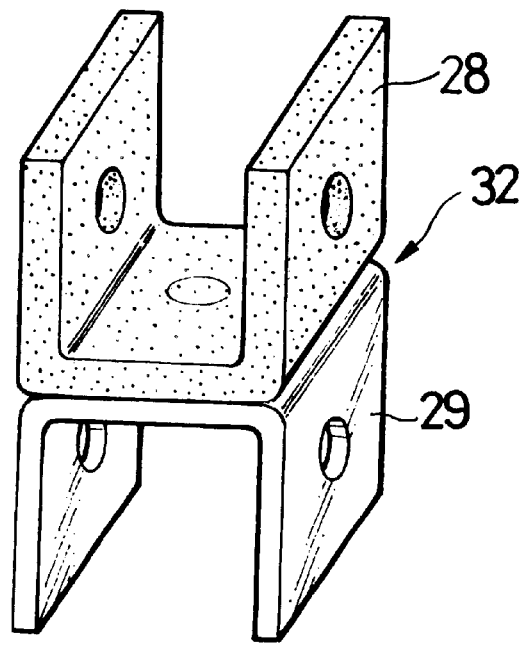
FIG. 17 is a perspective view showing a second example of the U-tensile test piece.

Then, a U-tensile test piece 32 shown in FIG. 17 according to a comparative example 1 was produced by carrying out a spot welding using the first and second halves 28 and 29 and using two lower electrodes 7 as upper and lower electrodes, respectively.

Figure 18:
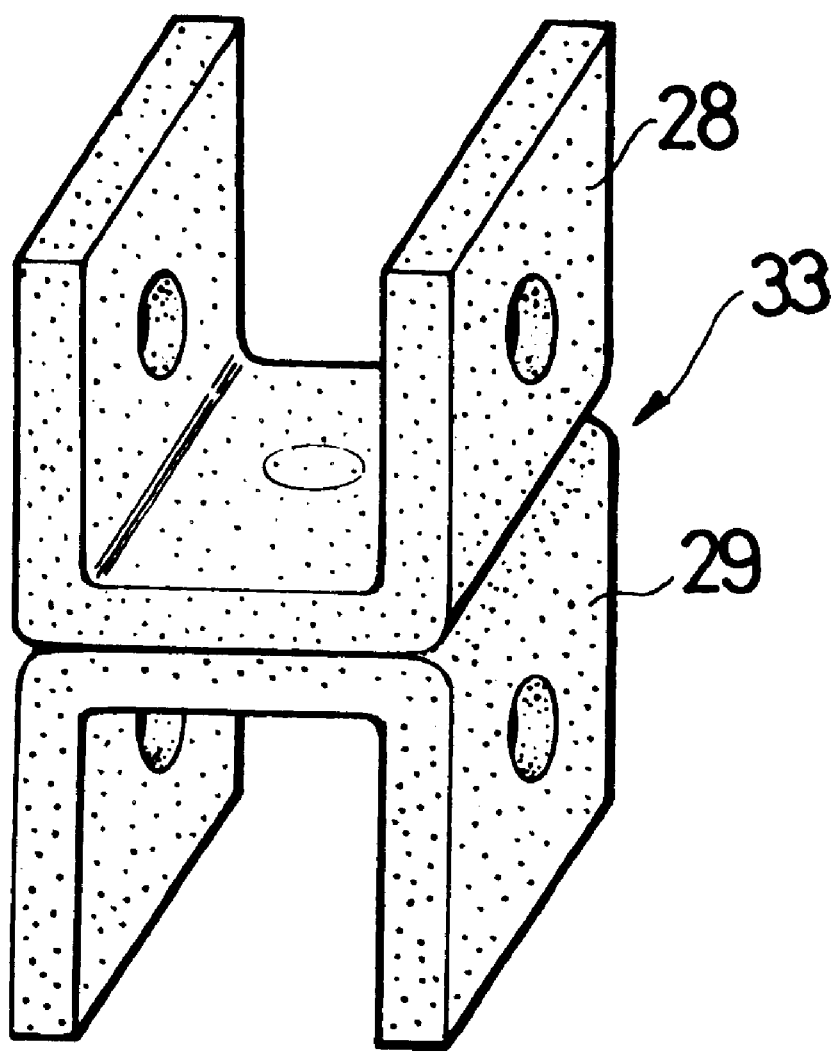
FIG. 18 is a perspective view showing a third example of the U-tensile test piece.

Further, a U-tensile test piece 33 shown in FIG. 18 according to a comparative example 2 was produced by carrying out a spot welding using the two first halves 28 and using two lower electrodes 7 as upper and lower electrodes, respectively.

Thereafter, the U-tensile test pieces 31 to 33 were subjected to a tensile test.

Table 1 shows the smaller-end diameter $D_3$ of the upper electrode 6, the welding conditions, the amount of expulsion and surface flash and the U-tensile strength for the U-tensile test pieces 31 to 33.

TABLE 1

| | Smaller-end diameter $D_3$ (mm) of upper electrode | Welding conditions | | | Amount of expulsion and surface flash | U-tensile strength (kgf) |
|---|---|---|---|---|---|---|
| | | Welding current (kA) | Pressing force (kgf) | Current supplying time (cycle) | | |
| Example 1 | 4 | 10 | 200 | 20 | smaller | 105 |
| Example 2 | 5 | 10 | 200 | 20 | smaller | 130 |
| Example 3 | 6 | 12 | 200 | 20 | slightly larger | 150 |
| Example 4 | 7 | 14 | 200 | 20 | larger | 200 |
| Comparative example 1 | — | 16 | 200 | 4 | smaller | 15 |
| Comparative example 2 | — | 24 | 400 | 4 | smaller | 95 |

As apparent from Table 1, it can be seen that the U-tensile strength of the test pieces according to Examples 1 to 4 is largely enhanced and exceeds the strength of bonding of the Al alloy plates according to the comparative example 2. It can be seen that the U-tensile strength of the test piece according to comparative example 2 is approximately one sixth of that of the comparative example 1.

Figure 19A:
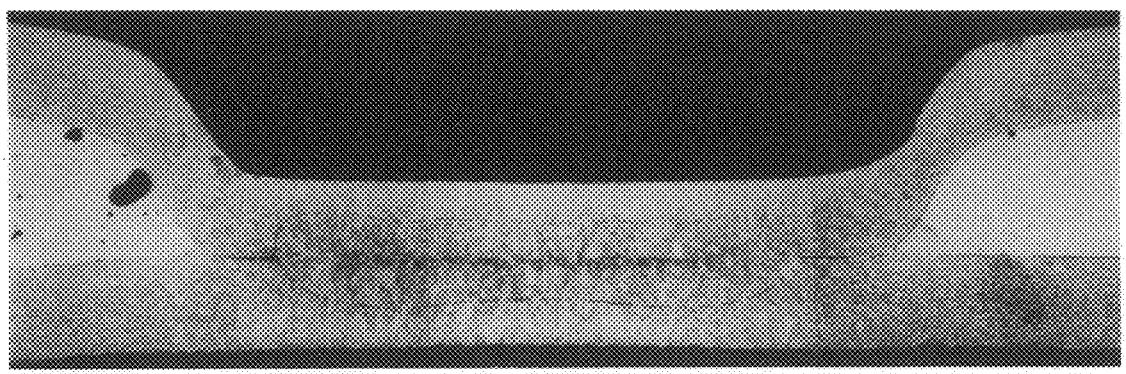
FIG. 19A is a photomicrograph showing the metallographic structure on a section of a bonded portion.
Figure 19B:
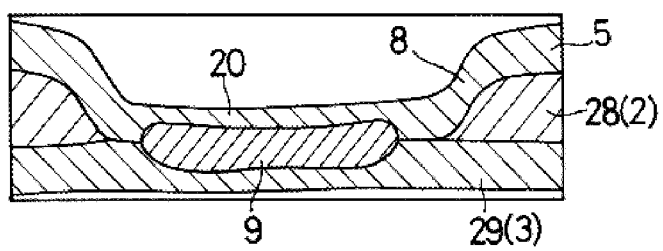
FIG. 19B is a reduced tracing of the photomicrograph shown in FIG. 19A.

FIG. 19A is a photomicrograph showing the metallographic structure of a section of the bonded zone of the test piece which is Example 1, and FIG. 19B is a reduced tracing of the photomicrograph shown in FIG. 19A. It can be seen from FIGS. 19A and 19B that the nugget 9 was formed between the smaller end 20 of the bulgy deformed portion 8 and the second half 29, whereby the first and second halves 28 and 29 were firmly bonded to each other.

If the diameter $D_3$ of the smaller end of the upper electrode 6 is equal to or larger than 6 mm as in Examples 3 and 4, the U-tensile strength is higher, but an expulsion and surface flash is generated.

Then, U-tensile test pieces 31 to 33 similar to those described above were produced by carrying out a bonding process similar to that described above, except that the thickness $t_1$ of the first half 28 was changed to 1.2 mm; the thickness $t_2$ of the second half 29 was changed to 0.8 mm and further, the welding conditions were partially changed.

Table 2 shows the smaller end diameter $D_3$ of the upper electrode 6, the welding conditions, the amount of expulsion and surface flash and the U-tensile strength for the U-tensile test pieces 31 to 33.

also prepared. The material for the Al alloy plate 2 was JIS 5182 and had a thickness $t_1$ set at 1.0 mm. The material for the steel plate 3 was JIS SPCC and had a thickness $t_2$ set at 0.7 mm. The diameter $D_1$ of the circular blank 5 was set at 15 mm.

Then, a bonding process similar to that described above (see FIGS. 5 to 9) was carried out to find the relationship between the taper angle θ and the mold release failure rate P, thereby giving a result shown in Table 3.

The welding conditions were as follows: The welding current was 10 kA; the pressing force was 200 kgf; and the current supplying time was 20 cycles. The mold release failure rate P was determined according to an equation, $P=(n/10)\times100$ (%), wherein the number of runs of a bonding operation carried out using the upper electrode 6 provided with the truncated conical protrusion 14 having a predetermined taper angle θ was 10; and the frequency of adhesion of the truncated conical protrusion 14 to the inner surface of the bulgy deformed portion 8 was represented by n. The term "adhesion" means a mechanically fitted state to the extent which permits the truncated conical protrusion 14 to be removed from the inner surface of the bulgy deformed portion 8 by striking the bonded product 1 by a hammer.

TABLE 2

| | Smaller-end diameter $D_3$ (mm) of upper electrode | Welding conditions | | | Amount of expulsion and surface flash | U-tensile strength (kgf) |
| --- | --- | --- | --- | --- | --- | --- |
| | | Welding current (kA) | Pressing force (kgf) | Current supplying time (cycle) | | |
| Example 5 | 4 | 10 | 200 | 4 | smaller | 181 |
| Example 6 | 5 | 12 | 200 | 20 | smaller | 205 |
| Example 7 | 6 | 14 | 200 | 20 | slightly larger | 240 |
| Example 8 | 7 | 14 | 200 | 20 | larger | 260 |
| Comparative example 3 | — | 16 | 400 | 4 | smaller | 20 |
| Comparative example 4 | — | 24 | 200 | 4 | smaller | 180 |

It can be seen that a tendency similar to that in Table 1 is recognized even in the case of Table 2.

B. Taper Angle θ of Truncated Conical Protrusion of Upper Electrode

A plurality of upper electrodes 6 each having a changed taper angle θ of a truncated conical protrusion 14 thereof were prepared. In this case, in the upper electrode 6, the diameter $D_2$ of the electrode body 12 was set at 16 mm; the smaller-end diameter $D_3$ of the truncated conical protrusion 14 was set at 4 mm; the length L of the truncated conical protrusion 14 was set at 3 mm; and the radius $R_1$ of the rounded portion 16 of the peripheral edge of the smaller end 15 was set at 1 mm.

In the lower electrode 7, the diameter $D_4$ was set at 16 mm, and the radius $R_2$ of the spherical tip end 30 was set at 80 mm.

A plurality of Al alloy plates 2, a plurality of steel plates 3 and a plurality of circular blanks 5 each made by punching of a steel plate of the same type as of the steel plates 3 were

TABLE 3

| | Taper angle θ (degree) | | | | |
| --- | --- | --- | --- | --- | --- |
| | 0 | 30 | 60 | 90 | 120 |
| Mode release failure rate P (%) | 100 | 90 | 80 | 40 | 0 |

As apparent from Table 3, the mold release failure rate P can be remarkably reduced by setting the taper angle θ in a range of $\theta \geq 90$ degree.

Figure 20:
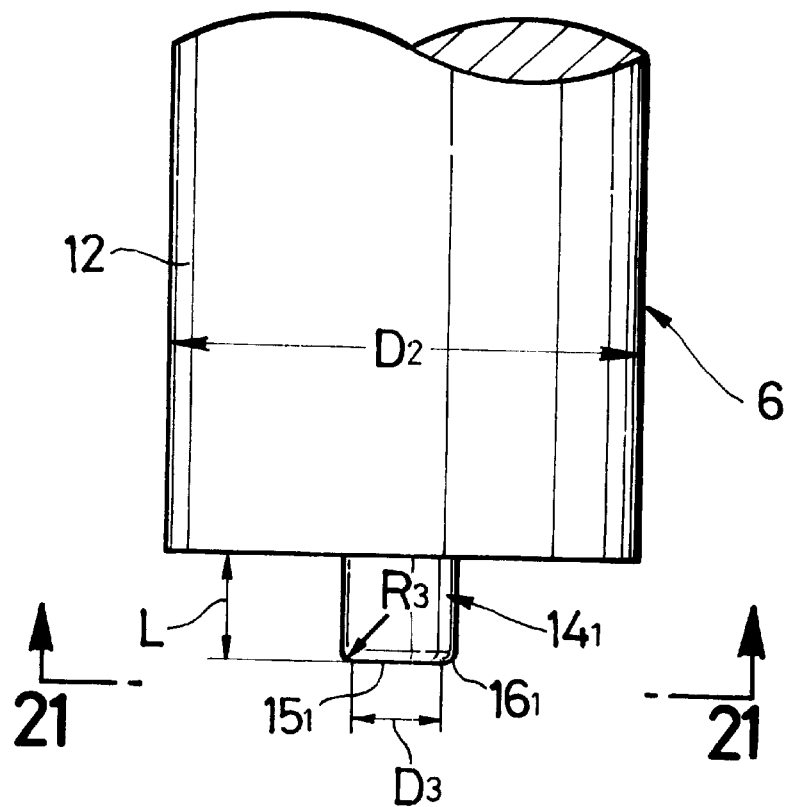
FIG. 20 is a front view of an essential portion of a second example of the upper electrode.
Figure 21:
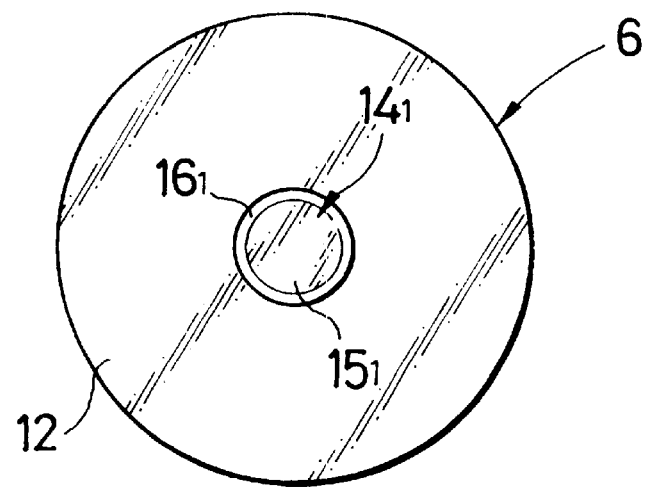
FIG. 21 is a view taken along a line 21—21 in FIG. 20.

C. FIGS. 20 and 21 show a modification to the upper electrode 6. The upper electrode 6 is comprised of a rod-like electrode body 12 which is circular in section, and a columnar protrusion $14_1$ projectingly provided on a lower end face of the electrode body 12. Therefore, the protrusion $14_1$ is a straight protrusion and has a circular section in a plane which intersects the direction of an electrode axis. The protrusion $14_1$ serves to form a bulgy deformed portion 8 on a circular blank 5, and has a rounded portion $16_1$ provided at an edge of a tip end face $15_1$, i.e., at a peripheral edge.

To determine the relationship between the radius $R_3$ of the rounded portion $16_1$ and the mold release failure rate P, a plurality of upper electrodes 6 having different radii $R_3$ were prepared. In each of the upper electrodes 6, however, the diameter $D_2$ of the electrode body 12 was set at 16 mm; the length L of the protrusion $14_1$ was set at 5 mm; and the diameter $D_3$ of the tip end face $15_1$ was set at 4 mm.

As shown in FIG. 3, in a lower electrode 7, the diameter $D_4$ was set at 16 mm, and the radius $R_2$ of the spherical tip end face 30 was set at 80 mm.

A plurality of Al alloy plates 2, a plurality of steel plates 3, and a plurality of circular blanks 5 made by punching from a steel plate of the same type as the steel plates 3 were also prepared. The material for the Al alloy plate 2 was JIS 5182 and had a thickness $t_1$ set at 1.0 mm. The material for the steel plate 3 was JIS SPCC and had a thickness $t_2$ set at 0.7 mm. The diameter $D_1$ of the circular blank 5 was set at 15 mm.

Then, a bonding process similar to that described above (see FIGS. 5 to 9) was carried out to find the relationship between the radius $R_3$ and the mold release failure rate P, thereby giving a result shown in Table 4.

The welding conditions were as follows: The welding current was 10 kA; the pressing force was 200 kgf; and the current supplying time was 20 cycles.

TABLE 4

| | Radius $R_3$ (mm) of rounded portion | | | |
| --- | --- | --- | --- | --- |
| | 0 | 1 | 2 | 3 |
| Mold release failure rate P (%) | 100 | 100 | 20 | 0 |

As apparent from Table 4, the mold release failure rate P can be remarkably reduced by setting the radius $R_3$ of the rounded portion $16_1$ in a range of $R_3 \geq 2$ mm.

Figure 22:
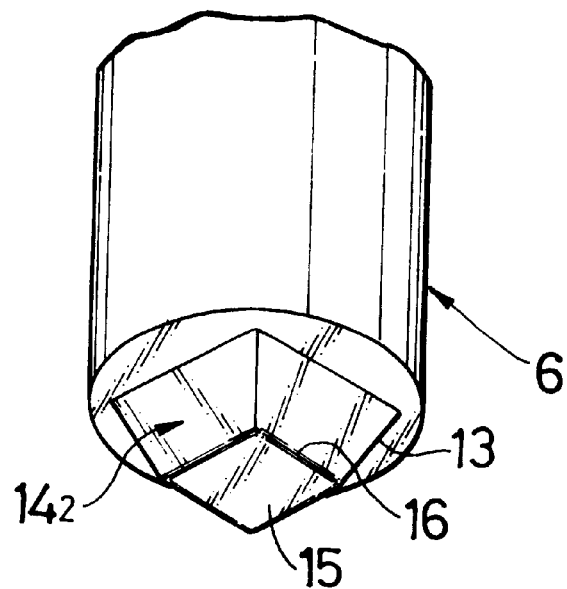
FIG. 22 is a perspective view of an essential portion of a third example of the upper electrode.
Figure 23:
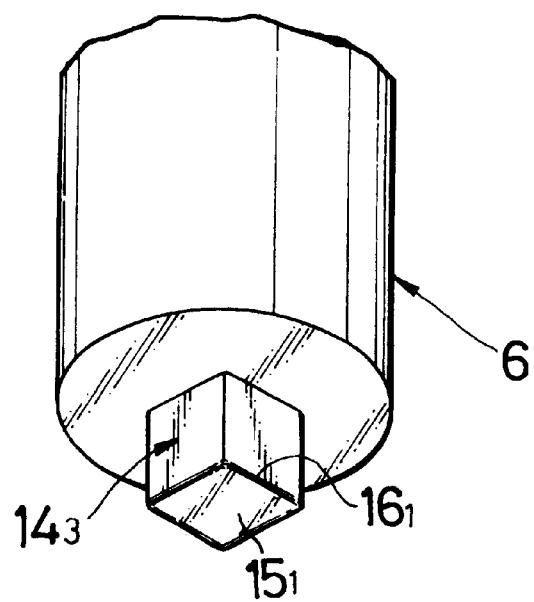
FIG. 23 is a perspective view of an essential portion of a fourth example of the upper electrode.

The protrusion in the upper electrode 6 may have a non-circular section, e.g., a square section as shown in FIGS. 22 and 23, without having a circular section as described above in the plane intersecting the direction of the electrode axis. Namely, the protrusion $14_2$ shown in FIG. 22 assumes a truncated quadrangular pyramidal shape and has a draft 13. The protrusion $14_3$ shown in FIG. 23 assumes a quadrangular columnar shape and has a rounded portion $16_1$ provided at an edge of the tip end face $15_1$, i.e., at a peripheral edge.

If the upper electrode 6 is constructed in the above manner, the relative rotation between the Al alloy plate 2 and the steel plate 3 can be reliably prevented.

Figure 24:
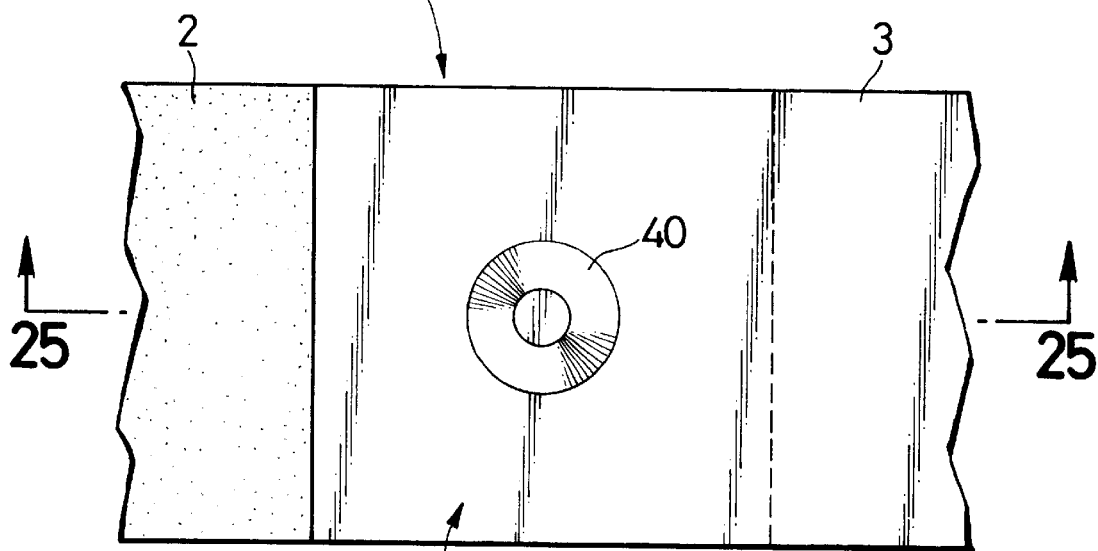
FIG. 24 is a plan view of a fifth example of the bonded product.
Figure 25:
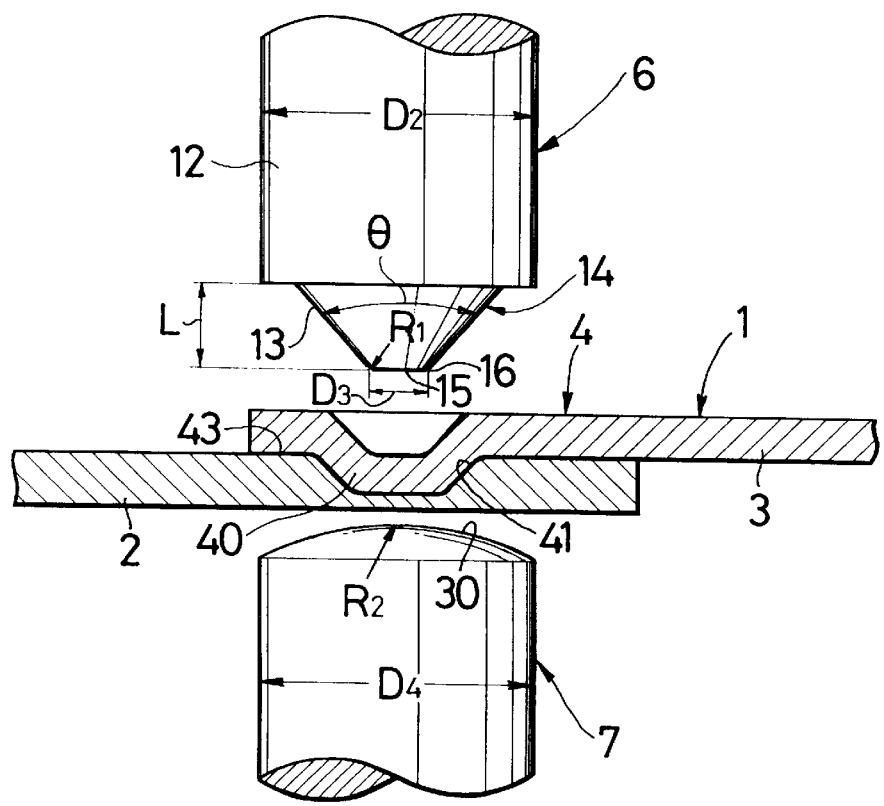
FIG. 25 is a sectional view taken along a line 25—25 in FIG. 24, showing the relationship between the bonded product and the upper and lower electrodes.

Referring to FIGS. 24 and 25, a bonded product 1 includes an Al alloy plate 2 and a steel plate 3, lapped areas 4 of which are bonded by utilizing a spot welding process as a resistance welding process, using a pair of upper and lower electrodes 6 and 7. In the bonded structure, a substantially truncated conical pressed/current supplied portion 40 bulged from the steel plate 3 and a substantially truncated conical recess 41 in the Al alloy plate 2 are in a fitted relation to each other, and a solid phase bonding is produced between the pressed/current supplied portion 40 and the Al alloy plate 2 at the recess 41. Namely, the plates 2 and 3 are bonded by a diffusion phenomenon in a very small area of a bond interface. In this case, no nugget is generated, or even if a nugget is generated, it is extremely small and hence, little contribute to the bonding.

The spot welding between the Al alloy plate 2 and the steel plate 3 will be described.

In FIGS. 4 and 25, an inverter welding machine is used as a spot welding machine, and includes an upper electrode 6 which is comprised of a rod-like electrode body 12 which is circular in section, and a truncated conical protrusion 14 projectingly provided on a lower end face of the electrode body 12 and having a draft 13. The protrusion 14 has a rounded portion 16 provided at a peripheral edge of a smaller end face 15. An electrode of JIS R type is used as a lower electrode 7, but an electrode of JIS CF type or CR type may be used.

Figure 26:
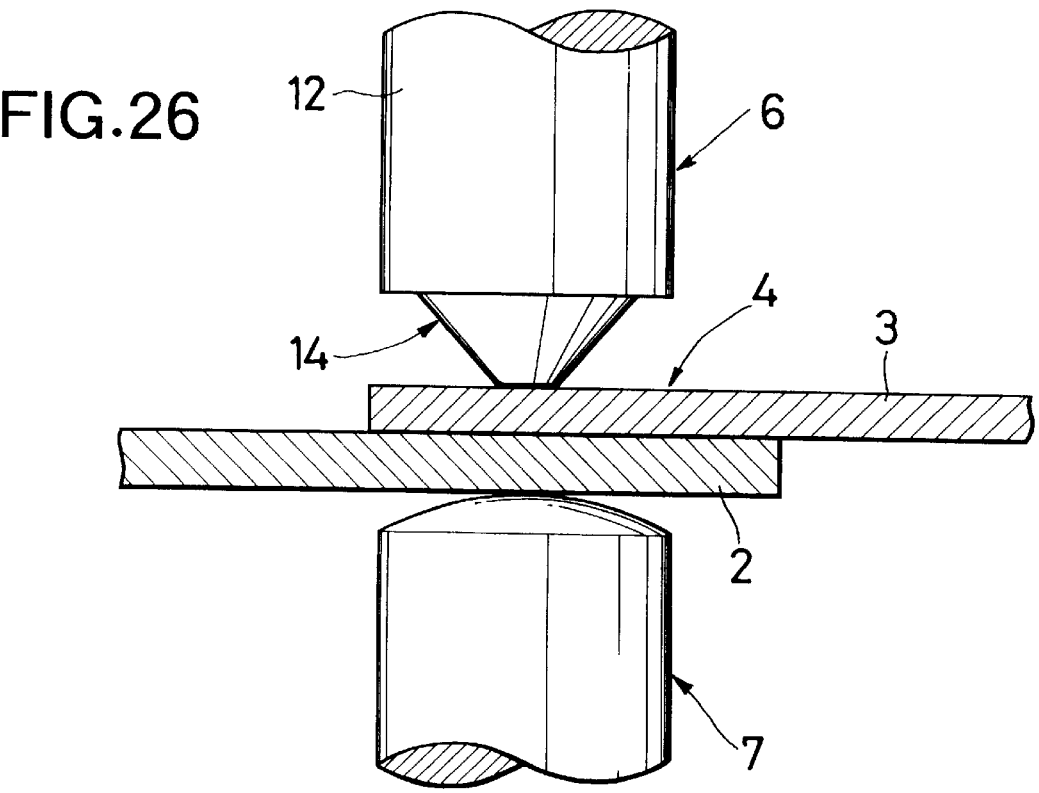
FIG. 26 is a sectional view showing a state in which a steel plate and an aluminum alloy plate are pressed between upper and lower electrodes and a welding current is allowed to flow between both the electrodes.

(a) As shown in FIG. 26, one end of a steel plate 3 is lapped onto one end of an Al alloy plate 2. Then, lapped areas 4 are disposed between both the electrodes 6 and 7 with the steel plate 3 located on the side of the upper electrode 6, and are then pressed by both the electrodes 6 and 7, while a welding current is allowed to flow between both the electrodes 6 and 7.

Figure 27:
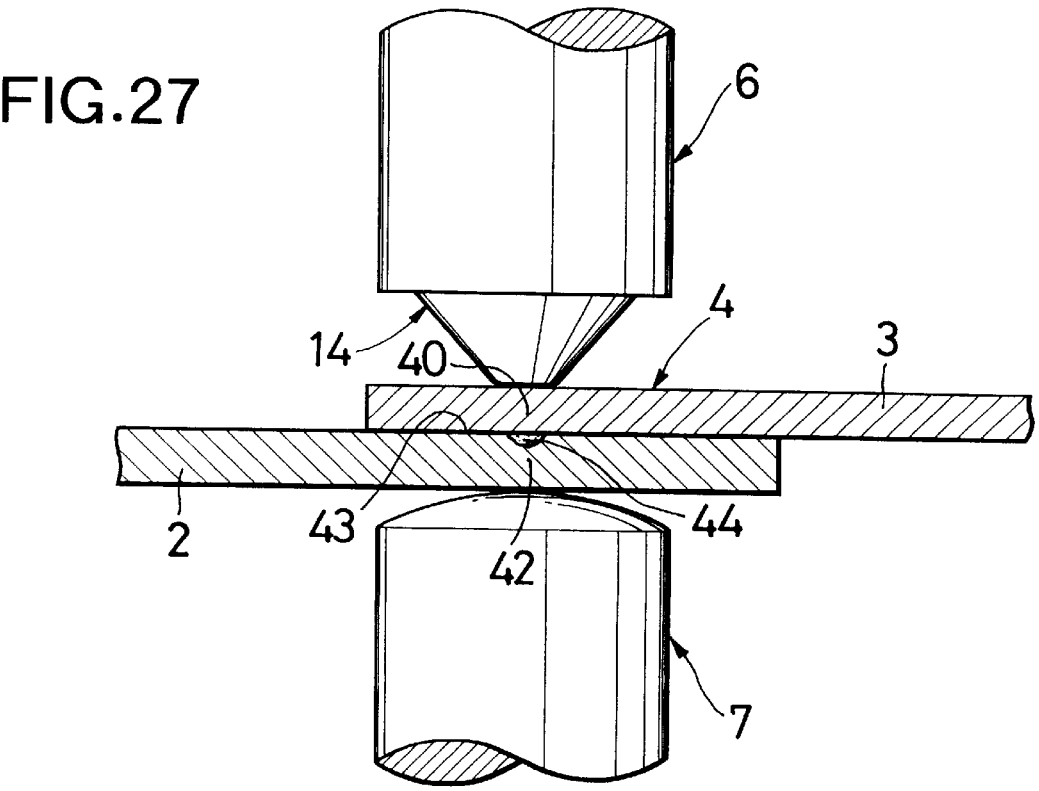
FIG. 27 is a sectional view showing a state in which a portion of the aluminum alloy plate has been molten.

(b) As shown in FIG. 27, by supplying of the current in the pressed state, pressed and current-supplied portions 40 and 42 of the steel plate 3 and the Al alloy plate 2 are softened, while at the same time, the bonded surface 43 of the pressed and current-supplied portion 42 of the Al alloy plate 2 having a lower melting point is slightly molten to form a small molten pool 44.

Figure 28:
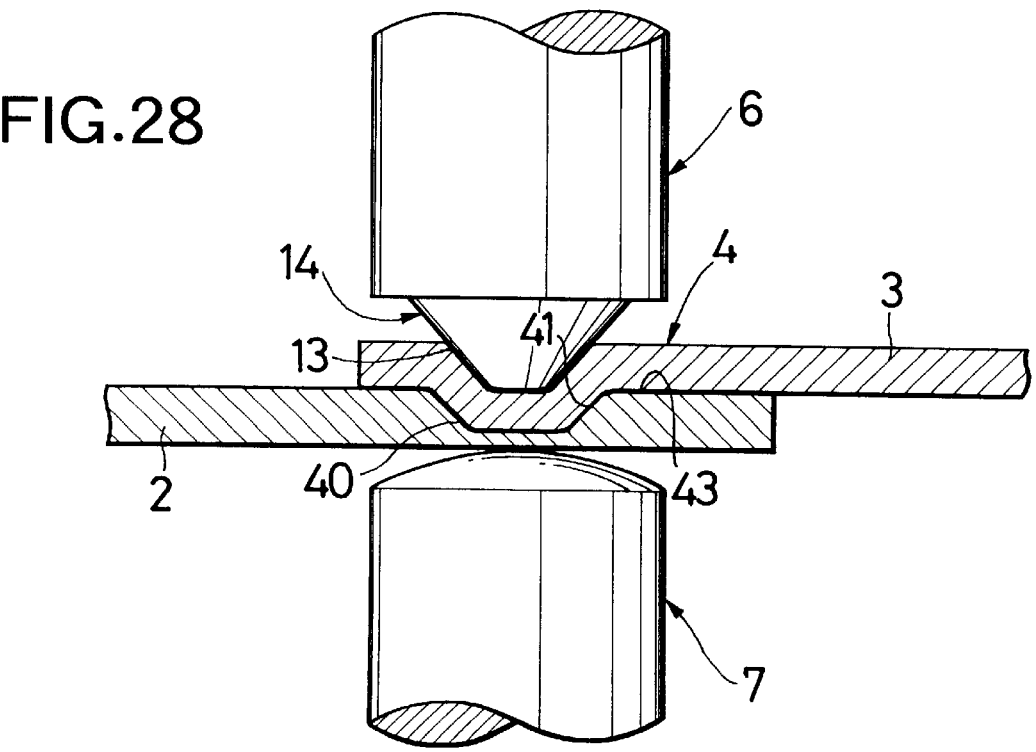
FIG. 28 is a sectional view showing a state in which the steel plate and the aluminum alloy plate have been bonded to each other.

(c) As shown in FIG. 28, the pressing force of the truncated conical protrusion 14 of the upper electrode 6 ensures that the pressed and current-supplied portion 40 of the steel plate 3 is bulged into a substantially truncated conical shape toward the Al alloy plate 2 by the plastic deformation of the steel plate 3, and a substantially truncated conical recess 41 by the plastic deformation of the Al alloy plate 2 is defined in the bonded surface 43 of the Al alloy plate 2 by the pressed and current-supplied portion 40. The molten metal in the molten pool 44 including an oxide film is discharged into a gap between both the plates 2 and 3 during the recess 41 is defined.

Since the recess 41 is defined by the melting of a portion of the Al alloy plate 2 and by the plastic deformation in the above manner, a cleaned surface is exposed in an area where the molten pool 44 has existed, as a result of the discharging of the molten metal, and a cleaned surf ace is exposed around the area where the molten pool 44 has existed, by the division of the oxide film by the plastic deformation of the Al alloy plate 2.

Thus, a firm solid-phase bonding Is produced between these cleaned surfaces and the pressed and current-supplied portion 40 of the steel plate 3.

After the above-described spot welding, the truncated conical protrusion 14 of the upper electrode 6 is easily withdrawn from the pressed and current-supplied portion 40, because it has the draft 13.

The formation of the molten pool 44 is not an essential requirement. Even if the molten pool 44 is not formed, the division of the oxide film is performed by the plastic deformation of the Al alloy plate 2 and hence, the cleaned surface is exposed in the recess 41.

Figure 29:
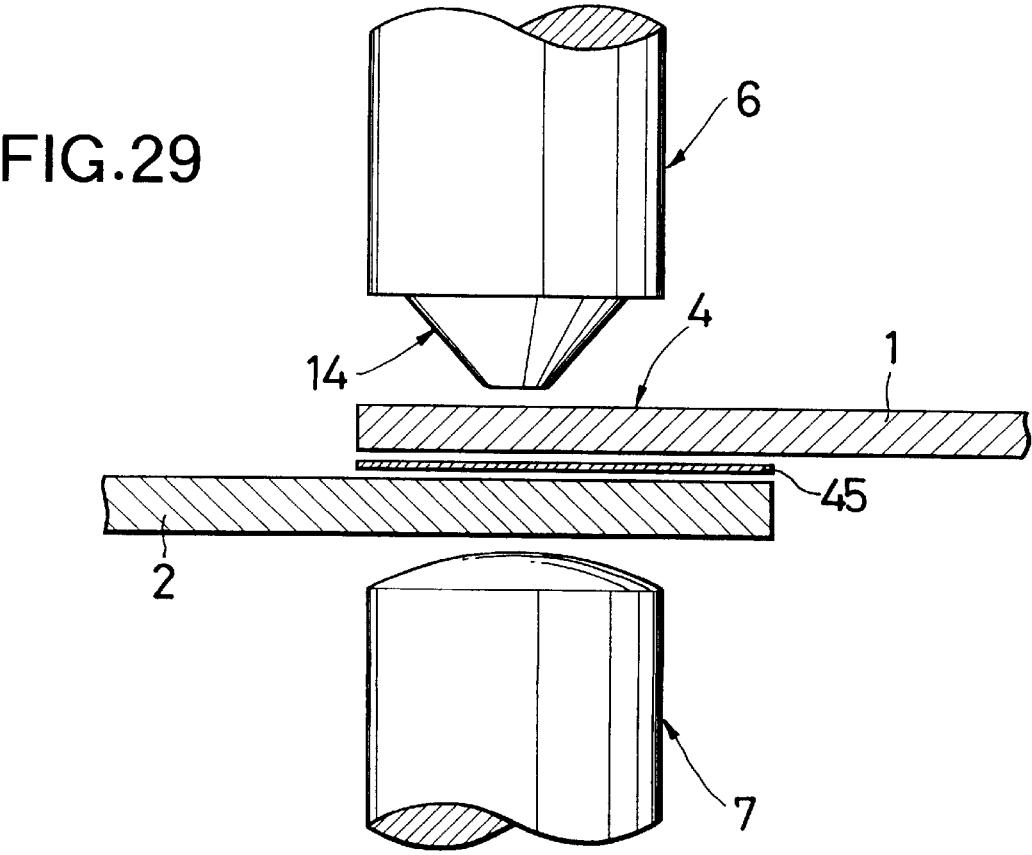
FIG. 29 is a sectional view showing the relationship of the steel plate, the aluminum alloy plate and an Ni insert lapped together.

As shown in FIG. 29, if a foil-like Ni-insert 45 made of only nickel is disposed between the steel plate 3 and the Al alloy plate 2 in the lapped areas 4, the bond strength can be enhanced more than in a case where the steel plate 3 and the Al alloy plate 2 are bonded directly to each other in a solid phase manner. This is because the strength of solid-phase bonding between the steel plate 3 and the Ni-insert 45 as well as between the Ni-insert 45 and the Al alloy plate 2 is higher than the strength of solid-phase bonding between the steel plate 3 and the Al alloy plate 2. Another reason is that nickel has an effect of breaking the oxide film on the surface of the Al alloy plate 2.

The Ni-insert 45 may be formed on the steel plate 3 or the Al alloy plate 2 by a plating process. Alternatively, the Ni-insert 45 may be formed on a steel foil or an Al alloy foil by a plating process. In the former case, the steel foil is opposed to the steel plate 3, and in the latter case, the Al alloy foil is opposed to the Al alloy plate 2.

Figure 30:
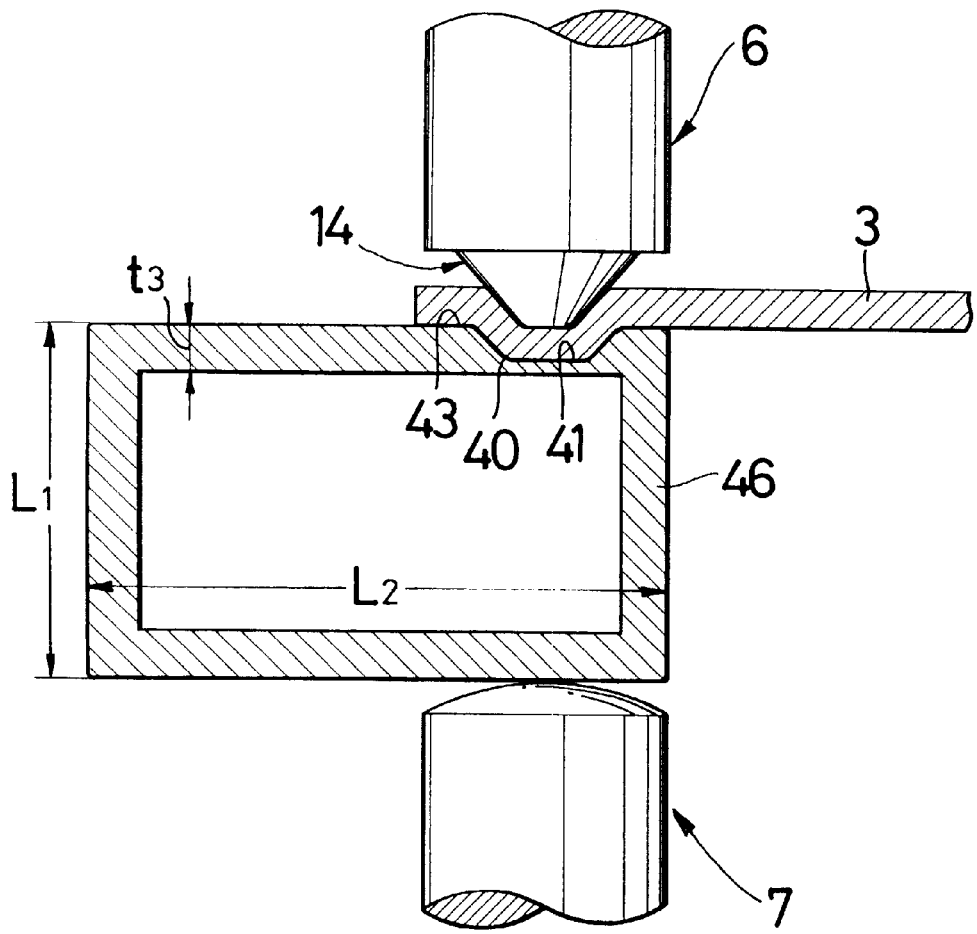
FIG. 30 is a sectional view showing a state in which the steel plate and an aluminum-based hollow extrudate have been bonded to each other.
Figure 31:
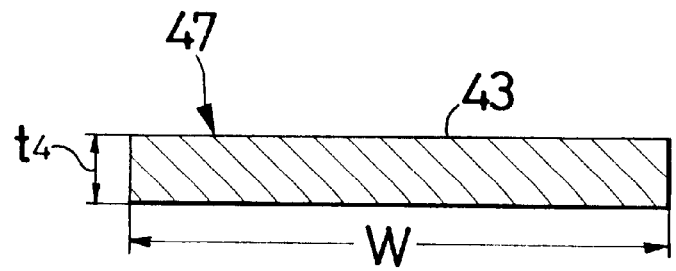
FIG. 31 is a sectional view of an aluminum-based solid extrudate.

The Al-based member is not limited to the Al alloy plate 2, and a hollow extrudate 46 quadrilateral in cross section or a band-like solid extrudate 47 may be used, as shown in FIGS. 30 and 31. The Fe-based member is not limited to the steel plate 3, and an angle material or the like may be used.

EXAMPLE 1

Figure 32:
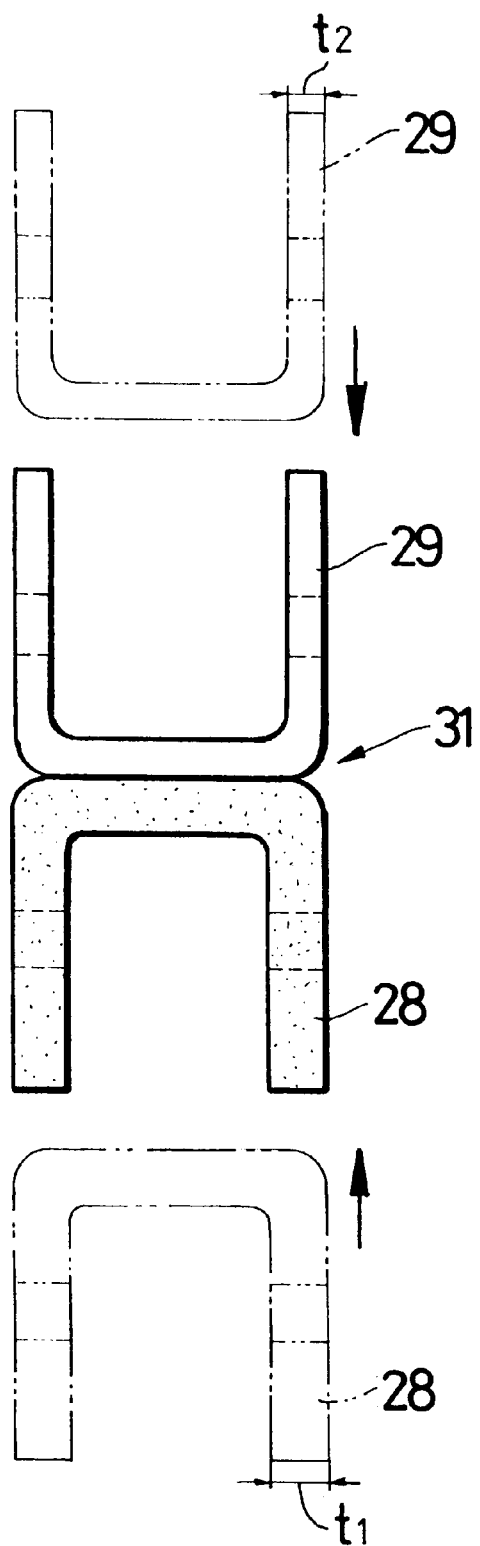
FIG. 32 is a front view of a U-tensile test piece.

As shown by a dashed line in FIG. 32, a plurality of first halves 28 for U-tensile test pieces were fabricated from an Al alloy plate 2, and a plurality of second halves 29 for U-tensile test pieces were fabricated from a steel plate 3, according to JIS Z 3137. The material for the Al alloy plate 2 was JIS 5182, and the thickness $t_1$ of the Al alloy plate 2 was set at 1 mm. On the other hand, the material for the steel plate 3 was JIS SPCC, and the thickness $t_2$ of the steel plate 3 was set at 0.7 mm.

As best shown in FIG. 25, in the upper electrode 6, the diameter $D_2$ of the electrode body 12 was set at 16 mm; the taper angle θ of the truncated conical protrusion 14 was set at 90 degrees; the length L of the truncated conical protrusion 14 was set at 4 mm; and the radius $R_1$ of the rounded portion 16 at the peripheral edge of the smaller end face 15 was set at 1 mm. The smaller-end diameter $D_3$ was varied in a range of 3 to 5 mm.

In the lower electrode 7, the diameter $D_4$ thereof was set at 16 mm, and the radius $R_2$ of the spherical tip end face 30 was set at 80 mm.

Using the first and second halves 28 and 29, examples 1 to 3 of U-tensile test pieces 31 according to the embodiment as shown by solid lines in FIG. 32 were produced by carrying out the same process as shown in FIGS. 26 and 28, except that the welding conditions were set uniformly, and the upper electrode 6 was changed.

Then, using the first and second halves 28 and 29, examples 4 and 5 of U-tensile test pieces 31 were produced as comparative examples by carrying out the same spot welding, except that two lower electrodes 7 were used as upper and lower electrodes, and the welding conditions were varied. Thereafter, the examples 1 to 5 were subjected to a tensile test.

Table 5 shows the smaller-end diameter $D_3$ of the upper electrode 6, the welding conditions, the amount of expulsion and surface flash and the U-tensile strength for the examples 1 to 5.

TABLE 5

| U-tensile test piece | Smaller-end diameter $D_3$ (mm) of upper electrode | Welding current (kA) | Pressing force (kgf) | Current supplying time (cycle) | Amount of expulsion and surface flash | U-tensile strength (kgf) |
|---|---|---|---|---|---|---|
| Example 1 | 3 | 10 | 200 | 10 | smaller | 55 |
| Example 2 | 4 | | | | slightly larger | 50 |
| Example 3 | 5 | | | | larger | 52 |
| Example 4 | — | 16 | 200 | 4 | smaller | 15 |
| Example 5 | | 10 | | 10 | | 10 |

As apparent from Table 5, examples 1 to 3 according to the embodiment have a high U-tensile strength, because the solid-phase bonding was produced between both the halves 28 and 29 by the cleaned surface of the first half 28.

In the case of example 4 as a comparative example, a nugget is formed on the first half 28, because the welding current is raised more than that of examples such as example 1. As a result, the U-tensile strength is significantly reduced, as compared with example 1 or the like.

In the case of example 5 as a comparative example, the solid-phase bonding was produced between both the halves 28 and 29, because the welding conditions were set in the same manner as in example 1 or the like. However, such solid-phase bonding was produced mainly between the oxide film of the first half 28 and the second half 29 and hence, the U-tensile strength is significantly reduced, as compared with example 1 or the like.

It should be noted that the U-tensile strength of a U-tensile test piece made through a spot welding process using the two first halves 28 and the two lower electrodes 7 as upper and lower electrodes was 95 kgf. In this case, the welding current was set at 24 kA; the pressing force was set at 400 kgf; and the current supplying time was set at 10 cycles, and both the halves 28 were bonded to each other through a nugget formed over both the halves.

EXAMPLE 2

Using first and second halves 28 and 29, an upper electrode 6 having a smaller-end diameter $D_3$ of 3 mm and an Ni-insert 45 which are similar to those in EXAMPLE-1, examples 1 to 3 of U-tensile test pieces 31 according to the embodiment as shown by solid lines in FIG. 32 were produced by carrying out the same process as shown in FIGS. 26 to 29.

Then, using first and second halves 28 and 29 and an Ni-insert 45 which are similar to those in EXAMPLE-1 and using two lower electrodes 7 as upper and lower electrodes, respectively, a spot welding process was carried out with welding conditions set uniformly, thereby producing example 4 of the U-tensile test piece 31 as a comparative example. Thereafter, examples 1 to 4 were subjected to a tensile test.

Table 6 shows the construction of the Ni-insert 45, the smaller-end diameter $D_3$ of the upper electrode 6, the welding conditions, the amount of expulsion and surface flash and the U-tensile strength for examples 1 to 4.

EXAMPLE 3

A plurality of hollow extrudates 46 and a plurality of solid extrudates 47 shown in FIGS. 30 and 31 were prepared. The material for both the extrudates 46 and 47 is JIS 6063. The size of the hollow extrudates 46 is 30 mm in longitudinal length $L_1$; 70 mm in lateral length $L_2$ and 4 mm in thickness $t_3$, as shown in FIG. 30. The size of the solid extrudates 47 is 60 mm in width W, and 5 mm in thickness $t_4$, as shown in FIG. 8(*b*).

Using a second half 29, an upper electrode 6 having a smaller-end diameter $D_3$ of 4 mm, extrudates 46 and 47 and an Ni-insert 45 which are similar to those in EXAMPLE-1, examples 1 and 2 of U-tensile test pieces according to the embodiment were produced by carrying out the same process as shown in FIGS. 26 to 29.

Then, using a second half 29 and extrudates 46 and 47 which are similar to those in EXAMPLE-1 and using two lower electrodes 7 as upper end lower electrodes, a spot welding is carried out with the welding conditions set uniformly, thereby producing examples 3 and 4 of U-tensile

TABLE 6

| U-tensile testpiece | Construction of Ni-insert | Smaller-end diameter $D_3$ (mm) of upper electrode | Welding conditions | | | Amount of expulsion and surface flash | U-tensile strength (kgf) |
|---|---|---|---|---|---|---|---|
| | | | Welding current (kA) | Pressing force (kgf) | Current supplying time (cycle) | | |
| Example 1 | Ni foil having a thickness of 100 μm | 3 | 10 | 200 | 10 | smaller | 98 |
| Example 2 | Ni foil having a thickness of 50 μm | | | | | | 100 |
| Example 3 | Ni-plated layer having a thickness of 20 μm on a steel foil having a thickness of 100 μm | | | | | | 87 |
| Example 4 | Ni foil having a thickness of 100 μm | — | 10 | 200 | 10 | smaller | 35 |

As apparent from Table 6, in examples 1 to 3 according to the embodiment, a solid-phase bonding by the cleaned surface of the first half 28 is produced and hence, the U-tensile strength is largely enhanced to be about 2.5 or more times larger than that of example 4 as the comparative example. As a result of use of the Ni-insert 45, the U-tensile strength of each of examples 1 to 3 is about 1.6 or more times larger than that of example 1 in Table 5 which was produced under the same conditions as in examples 1 to 3, except that the Ni-insert 45 was not used.

test pieces as comparative examples. Thereafter, examples 1 to 4 were subjected to a tensile test.

Table 7 shows constructions of the used extrudates 46 and 47 and the Ni-insert 45, the smaller-end diameter $D_3$ of the upper electrode 6, the welding conditions, the amount of expulsion and surface flash and the U-tensile strength for examples 1 to 4.

TABLE 7

| U-tensile test piece | Used extrudate | Construction of Ni-insert | Smaller-end diameter $D_3$ (mm) of upper electrode | Welding conditions | | | Amount of expulsion and surface flash | U-tensile strength (kgf) |
|---|---|---|---|---|---|---|---|---|
| | | | | Welding current (kA) | Pressing force (kgf) | Current supplying time (cycle) | | |
| Example 1 | Hollow | Ni foil having a thickness of 100 μm | 4 | 12 | 200 | 10 | smaller | 150 |
| Example 2 | Solid | | | | | | | 142 |
| Example 3 | Hollow | — | — | 12 | 200 | 10 | smaller | 55 |
| Example 4 | Solid | | | | | | | 47 |

As apparent from Table 7, if example 1 is compared with example 3 and example 2 is compared with example 4, the solid-phase bonding by the cleaned surfaces of the hollow and solid extrudates 46 and 47 is produced in examples 1 and 2, and each of examples 1 and 2 has a high U-tensile strength, as compared with examples 3 and 4, because of use of the Ni-insert 45.

In this way, according to EXAMPLE-3, not only the Al-based plate but also the Al-based extrudate and the Fe-based member can be firmly bonded to each other.

It should be noted that in examples 1 and 2, a seam welding process and a projection welding process, in addition to the spot welding process, are included in the resistance welding process. In the projection welding process, a projection which is a pressed and current-supplied portion 40 is formed on an Fe-based member.

What is claimed is:

1. A process for lap-bonding of two types of metal members having different melting points by lapping a first metal member and a second metal member having a melting point higher than a melting point of said first metal member onto each other, and bonding resulting lapped areas to each other, said process including the steps of selecting an Al-based member having a planar portion as said first metal member and an Fe-based member having a planar portion as said second metal member; lapping the first and second metal members onto each other at said planar portions; pressing said lapped areas by a pair of electrodes and supplying a current between both the electrodes, thereby forming a recess on a bonded surface of said Al-based member by a deformation of the Al-based member through medium of a pressed and current-supplied portion of said Fe-based member; and bonding said pressed and current-supplied portion and said Al-based member to each other at said recess.

2. A process for lap-bonding of two types of metal members having different melting points by lapping a first metal member and a second metal member having a melting point higher than a melting point of said first metal member onto each other, and bonding resulting lapped areas to each other, said process including the steps of selecting an Al-based member having a planar portion as said first metal member and an Fe-based member having a planar portion as said second metal member; lapping the first and second metal members onto each other at said planar portions; pressing said lapped areas by a pair of electrodes and supplying a current between both the electrodes, thereby allowing a pressed and current-supplied portion of said Fe-based member to be bulged toward said Al-based member by a plastic deformation of said Fe-based member, and at the same time, forming a recess an a bonded surface of said Al-based member by a deformation of said Al-based member through medium of said pressed and current-supplied portion of said Fe-based member, thereby bonding said pressed and current-supplied portion and said Al-based member to each other at said recess.

3. A process for lap-bonding of two types of metal members having different melting points according to claim 1 or 2, wherein an Ni-insert is disposed between said Fe-based member and said Al-based member in said lapped areas.

* * * * *